US010302673B2

(12) United States Patent
Walter et al.

(10) Patent No.: US 10,302,673 B2
(45) Date of Patent: May 28, 2019

(54) MINIATURIZED AND COMPACT PROBE FOR ATOMIC FORCE MICROSCOPY

(71) Applicants: VMICRO, Villeneuve d'Ascq (FR); CENTRE NATIONAL DE LA RECHERCHE SCIENTIFIQUE, Paris (FR); UNIVERSITE LILLE-1, Villeneuve d'Ascq (FR)

(72) Inventors: Benjamin Walter, Lille (FR); Marc Faucher, Lesquin (FR); Estelle Mairiaux-Mage, Lille (FR)

(73) Assignees: VMICRO, Villeneuve d'Ascq (FR); CENTRE NATIONAL DE LA RECHERCHE SCIENTIFIQUE, Paris (FR); UNIVERSITE LILLE-1, Villeneuve d'Ascq (FR)

( * ) Notice: Subject to any disclaimer, the term of this patent is extended or adjusted under 35 U.S.C. 154(b) by 0 days.

(21) Appl. No.: 15/788,689

(22) Filed: Oct. 19, 2017

(65) Prior Publication Data
US 2018/0113149 A1 Apr. 26, 2018

(30) Foreign Application Priority Data

Oct. 21, 2016 (FR) ..................................... 16 60215

(51) Int. Cl.
*G01Q 20/02* (2010.01)
*G01Q 60/38* (2010.01)
(Continued)

(52) U.S. Cl.
CPC ............ *G01Q 20/02* (2013.01); *G01Q 60/38* (2013.01); *G01Q 70/10* (2013.01); *G01Q 10/045* (2013.01); *G01Q 20/04* (2013.01)

(58) Field of Classification Search
USPC .......................................................... 850/6
See application file for complete search history.

(56) References Cited

U.S. PATENT DOCUMENTS 7,051,582 B2 * 5/2006 Akiyama ............... B82Y 35/00
250/306
7,598,092 B2 * 10/2009 Toone .................. G01N 29/036
435/287.1
(Continued)

FOREIGN PATENT DOCUMENTS

WO      2008/148951 A1     12/2008
WO      2016/138398 A1      9/2016
WO      2017/012927 A1      1/2017

OTHER PUBLICATIONS

An Toshu et al., "Automatically-resolved imaging by frequency-modulation atomic force microscopy using a quartz length-extension resonator," Applied Physics Letters, vol. 87, No. 13, Sep. 22, 2005, pp. 133114-133114, XP012075821.
(Continued)

*Primary Examiner* — Phillip A Johnston
(74) *Attorney, Agent, or Firm* — Baker & Hostetler LLP

(57) ABSTRACT

A probe for atomic force microscopy comprises a tip for atomic force microscopy oriented in a longitudinal direction, wherein: the tip is arranged at one end of a sensitive part of the probe, which is movable or deformable and linked to a support structure, which is anchored to the main surface of the substrate; the sensitive portion and the support structure are planar elements, extending mainly in planes that are parallel to the main surface of the substrate; the sensitive portion is linked to the support structure via at least one element allowing the sensitive portion to be displaced or to be extended in this direction; and the tip, the sensitive part and the support structure protrude from an edge of the substrate in the longitudinal direction. An atomic force microscope comprising at least one such probe is also provided.

17 Claims, 14 Drawing Sheets

(51) Int. Cl.
*G01Q 70/10* (2010.01)
*G01Q 10/04* (2010.01)
*G01Q 20/04* (2010.01)

(56) References Cited

U.S. PATENT DOCUMENTS

| | | | | |
|---|---|---|---|---|
| 7,992,431 | B2* | 8/2011 | Shih | B82Y 35/00 |
| | | | | 73/105 |
| 9,709,597 | B2* | 7/2017 | Wang | G01Q 70/16 |
| 2007/0108159 | A1* | 5/2007 | Kobayashi | B82Y 35/00 |
| | | | | 216/2 |
| 2008/0011058 | A1* | 1/2008 | Lal | G01N 29/022 |
| | | | | 73/54.23 |
| 2012/0131702 | A1 | 5/2012 | Shi et al. | |
| 2014/0338074 | A1 | 11/2014 | Aksyuk et al. | |

OTHER PUBLICATIONS

Clemens Mueller-Falcke et al., "Switchable stiffness scanning microscope probe," Jan. 1, 2005, XP055273841.
F. Giessibl et al., "Exploring the nanoworld with atomic force microscopy," Physics Today, Dec. 2006, pp. 44-50.
G. Anetsberger et al., "Cavity optomechanics and cooling nanomechanical oscillators using microresonator enhanced evanescent near-field coupling," Comptes Rendus Physique, vol. 12, 2011, pp. 800-816.
B. Walter, "Fabrication of high-frequency micro-resonators for atomic force microscopy on biological objects," Thesis defended at Lille University of Science and Technology, Dec. 13, 2011.

* cited by examiner

MINIATURIZED AND COMPACT PROBE FOR ATOMIC FORCE MICROSCOPY

CROSS-REFERENCE TO RELATED APPLICATIONS

This application claims priority to foreign French patent application No. FR 1660215, filed on Oct. 21, 2016, the disclosure of which is incorporated by reference in its entirety.

FIELD OF THE INVENTION

The invention relates to a probe for atomic force microscopy and to an atomic force microscope comprising at least one such probe.

BACKGROUND

Atomic force microscopy (or AFM) is a scanning microscopy technique that was developed at the beginning of the 80s and makes it possible to achieve a resolution on the scale of individual atoms. Unlike scanning tunneling microscopy, atomic force microscopy is not limited to forming images of conductive surfaces, thereby making it suitable for insulating materials, semiconductors or even biological samples. This technique finds application in numerous fields of pure and applied research, as well as in the microelectronics industry. A general introduction to the principles of AFM is provided by the article by F. J. Giessibl and C. F. Quate "Exploring the nanoworld with atomic force microscopy", Physics Today, December 2006, pages 44-50.

The main component of a conventional atomic force microscope is a probe that consists of a cantilever that is fixed at one end and provided at the opposite end with a tip oriented towards the surface of the sample to be observed. The length of the cantilever is generally of the order of a few tens or hundreds of micrometers, and the tip has a radius of curvature of a few tens or hundreds of nanometers. Such a probe, which generally consists of monocrystalline silicon or silicon nitride, may be fabricated by means of conventional photolithographic techniques, and at low cost. When the tip of the probe is brought close to a surface, it is subject to attractive or repulsive chemical, van der Waals, electrostatic and/or magnetic forces. By measuring these forces while the tip scans the surface of the sample to be observed, it is possible to reconstruct an image of the latter. The forces exerted between the tip and the sample may be measured in various ways. According to the oldest and simplest technique (static AFM), these are limited to observing, in particular through optical means, the deflection of the cantilever bearing the tip.

Improved sensitivity may be obtained by vibrating this cantilever in one of its natural bending modes, and by observing the variations in resonant frequency generated by the gradients of these forces (dynamic AFM). In practice, the dynamic technique is generally preferred for observations made in vacuum or in air. This technique is less suitable for observations in a liquid medium, since the vibrations of the cantilever are heavily damped thereby, which negatively affects the quality factor of the probe.

Another imaging technique consists in bringing the tip down to the surface, then retracting it. During the approach phase, the tip comes into contact with the surface, and the cantilever bearing it flexes; during the retraction phase, it adheres to the surface for a certain time, and the cantilever then flexes in the opposite direction. Since the amplitude of the movement is known, measuring the deformation of the cantilever over time makes it possible to determine the topography of the sample and its local mechanical properties, one point at a time. This technique, referred to as force curve imaging, is known for example from document US2012/0131702. It is non-resonant; thus, the displacement of the probe must occur at a much lower frequency than that of the fundamental mode of vibration of the cantilever. This limits the speed of image acquisition.

It is also known practice to employ AFM probes using planar modes of vibration—"vertical movement" is also spoken of—which make it possible to achieve very high quality factors even in dynamic AFM mode in viscous media.

For example, the article by Toshu An et al. "Atomically-resolved imaging by frequency-modulation atomic force microscopy using a quartz length-extension resonator", Applied Physics Letters 87, 133114 (2005) describes a probe for AFM comprising a micromechanical resonator formed by a quartz beam, held in its medium by a rigid frame that is also made of quartz, which vibrates in an extensional mode. An AFM tip is bonded to one end of this beam, aligned with its longitudinal axis. This resonator exhibits a high quality factor, but also substantial rigidity which greatly limits the amplitude of the vibrations (typically smaller than 1 nm or at most a few nanometers). Additionally, the probe is not produced as one piece, thereby limiting the miniaturization thereof.

The Swiss company SPECS GmbH markets a "KolibriSensor" AFM probe based on this principle.

International application WO 2008/148951 describes a monolithic AFM probe employing a ring- or disk-shaped resonator which oscillates in a volume mode (planar deformation). Such a probe makes it possible to achieve high frequencies, which is favorable for obtaining a high quality factor even when it is used in a viscous medium. In addition, it is less stiff than the probe described by Toshu An et al., and lends itself to greater miniaturization since it can be produced as one piece. However, balancing the masses attached to the resonator—essential for guaranteeing the presence of a mode with a high quality factor—is difficult.

In his thesis "Fabrication de micro-résonateurs haute fréquence pour la microscopie à force atomique sur des objets biologiques" ("Fabrication of high-frequency micro-resonators for atomic force microscopy on biological objects") defended at Lille University of Science and Technology on Dec. 13, 2011, B. Walter (one of the present inventors) has described an AFM probe comprising a tip attached to the median region of a flexible beam which exhibits two or four points of fixation, which points are located on either side of the tip. The latter is oriented in a direction that is perpendicular to the longitudinal axis of the beam. Producing such a probe is difficult since the mass of the tip interferes with its modes; in addition, it is sensitive to the position of the anchors, which position must be chosen before it is possible to characterize the tip.

In his thesis "Switchable Stiffness Scanning Microscope Probe", defended at the Technical University of Darmstadt in June 2005, Clemens T. Mueller-Falcke describes a vertical AFM probe with adjustable stiffness. In this probe, the AFM tip is borne by a longitudinal beam, which is linked to a frame by a hairpin spring and an annular mechanical resonator; the frame is itself linked to an anchor by hairpin springs. An electrostatic actuator is provided between the anchor and the substrate.

Despite their structural differences, the AFM probes using planar modes of vibration known from the prior art share a certain number of drawbacks, in particular their bulk. These bulk constraints are linked to the fact that the AFM tip protrudes relatively little from the planar substrate on which the probe is produced. Stated otherwise, the tip extends from the edge of said substrate over a distance that is very small with respect to the width of the substrate (its largest dimension perpendicular to the tip), but also with respect to its thickness (its smallest dimension perpendicular to the tip). Because of this, the tip must be held substantially perpendicular to the surface of the sample being observed by AFM, which must be planar and smooth: any incline of more than a few degrees, or any irregularity in the surface of more than a few micrometers, will lead to undesirable contact between the substrate of the probe and the sample. This severely limits the possibilities when it comes to studying biological samples (which are generally not smooth) and carrying out simultaneous optical and AFM observations or analyses of one and the same region of a sample.

At first glance, it would appear possible to envisage overcoming these bulk constraints by using longer AFM tips, or tips formed at the free end of long and thin beams. However, this presents considerable difficulties. Specifically, an AFM tip or beam mounted as a cantilever and extending over a relatively substantial length (ten times its width, or even more; typically this corresponds to a few tens or hundreds of micrometers) exhibits parasitic bending modes that are liable to be activated unintentionally and to interrupt the normal operation of the beam. In addition, in the case of a probe of the type described in WO 2008/148951, an overly long—and hence heavy—tip will disrupt the elliptical deformation modes of the ring-shaped resonator.

In the case of the aforementioned article by Toshu An et al., the tip is attached to the end of the beam of considerable length (longer than 1 mm). However, in order to prevent excitation of the bending modes and to facilitate bonding of the attached tip, this beam has a relatively substantial cross section, with dimensions of the order of 100 µm, while the AFM tip protrudes from the beam only by around ten micrometers. Hence it is the longitudinal beam bearing the tip, rather than the frame supporting this beam, that introduces ultimately quite significant bulk constraints.

Document WO 2016/138398 discloses an AFM probe comprising a plurality of tips borne by longitudinal beams supported by support elements which extend beyond the edge of the substrate. These beams are thick, which limits their mechanical resonant frequency.

The invention aims to overcome the aforementioned drawbacks of the prior art. More particularly, it aims to provide a compact, vertically movable AFM probe having good mechanical properties—i.e. a planar displacement in a well-defined direction, little affected by parasitic modes within the plane or outside of the plane. Advantageously, an AFM probe according to the invention must exhibit a high resonant frequency within the plane (higher than or equal to 1 MHz) and an amplitude of displacement of the tip that may be comprised between approximately one and a hundred nanometers. According to various embodiments, it must be possible to use it in a resonant or non-resonant mode, and in particular in force curve imaging mode. In the latter case, the invention also aims to make it possible to endow the tip with a mean displacement that may reach several micrometers, in combination with a higher image acquisition rate than in the prior art.

In order to obtain a high resonant frequency (and hence image acquisition rate) without simultaneously having an overly high stiffness—and hence an insufficient amplitude of displacement of the tip—the mass of the movable elements of the probe, including the tip, must be as low as possible. This may be achieved by producing these elements on the basis of a thin-film material, having a thickness of a few hundreds of nanometers only. However, such an approach presents difficulties, since a movable portion of such low thickness necessarily exhibits a high degree of flexibility. In order to avoid parasitic deformation modes, in particular bending out of plane, it would therefore be necessary for this part to protrude from the edge of the substrate only by a few micrometers at most. This is unacceptable for at least two reasons:

First, the etching of the substrate has a tolerance of several micrometers, thereby making the position of the edge imprecisely defined. Trying too hard to miniaturize the probe therefore runs the risk of the tip not protruding from the edge of the substrate, which would render it inoperable.

Secondly, the bulk constraints would be too great.

The invention makes it possible to overcome these obstacles by virtue of the use of a mechanical support structure anchored to the substrate, extending beyond the edge of the substrate and supporting the sensitive part of the probe without blocking it. The sensitive part of the probe may therefore be very thin, since it is the support structure which provides it with the required mechanical stability. In this way, it is possible to independently optimize the resonant frequency (which depend solely on the structure of the sensitive part, and in particular on its mass) and the mechanical stiffness with respect to bending out of plane (which mainly depends on the support structure); parasitic resonant modes are also avoided. According to one particular embodiment of the invention, the mechanical support structure is arranged "above" the sensitive part of the probe, i.e. on the side opposite the substrate.

SUMMARY OF THE INVENTION

One subject of the invention is therefore a probe for atomic force microscopy comprising a tip for atomic force microscopy borne by a planar substrate having a main surface, said tip being oriented in a direction referred to as the longitudinal direction, parallel to said main surface, characterized in that:

the tip is arranged at one end of a sensitive part of the probe, which is movable or deformable and linked to a support structure, which is anchored to the main surface of the substrate;

the sensitive part and the support structure are planar elements, extending mainly in planes that are parallel to the main surface of the substrate;

the sensitive part is linked to the support structure via at least one element allowing said sensitive part to be displaced or to be extended in this direction;

the tip, the sensitive part and the support structure protrude from an edge of the substrate in said longitudinal direction;

the sensitive part of the probe is at least partly formed by a portion of a layer of a first material, referred to as the first layer, separated from the main surface of the substrate, and the support structure is formed by a portion of a layer of a second material, referred to as the second layer, that is thicker than the first layer and arranged either above the first layer with respect to the substrate or between the first layer and the substrate.

Another subject of the invention is an atomic force microscope comprising at least one such probe. It may advantageously be configured to operate in force curve imaging mode.

BRIEF DESCRIPTION OF THE DRAWINGS

Other features, details and advantages of the invention will become apparent upon reading the description provided with reference to the appended drawings, which are given by way of example and show, respectively.

Figure 1A:
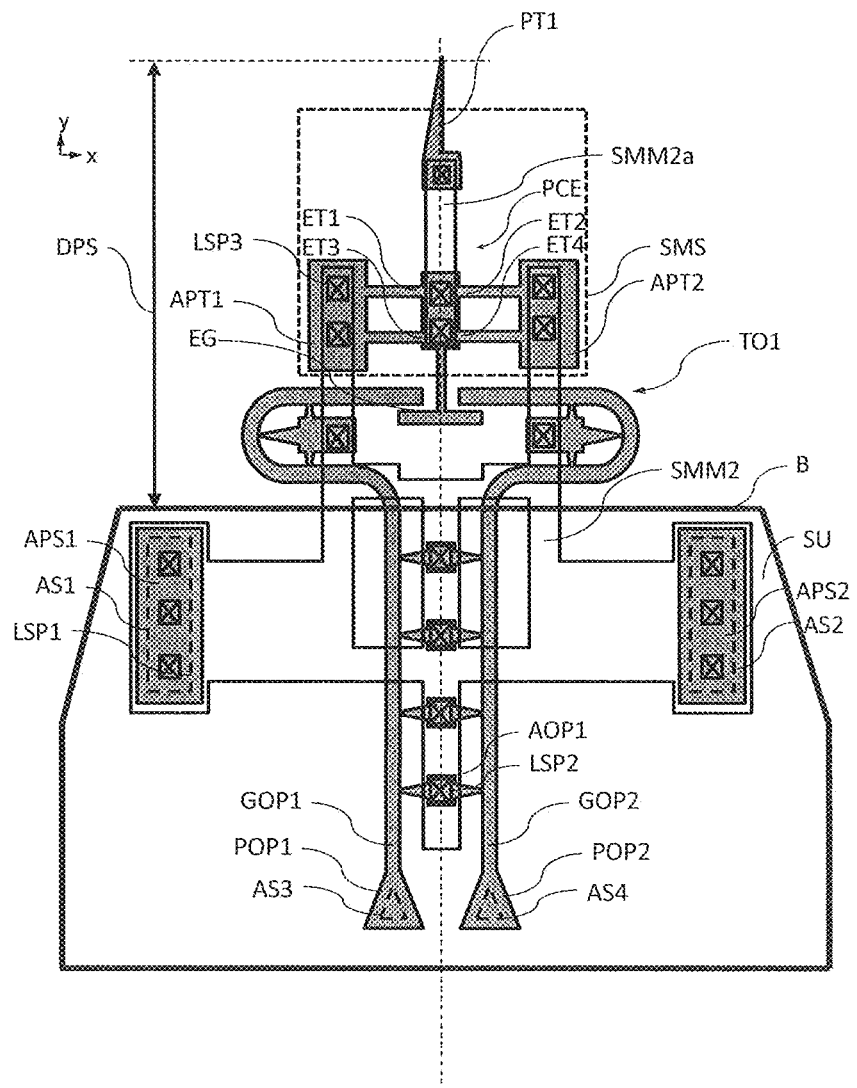
FIG. 1A, a plan view of a probe according to a first embodiment of the invention.

In the various figures, the same references denote identical, or at least functionally equivalent, elements.

DETAILED DESCRIPTION

A probe according to the invention may for example be fabricated on the basis of an SOI (silicon-on-insulator) structure, comprising a silicon substrate (denoted by SU in the figures), in general from 20 μm to 1 mm thick, preferably between 50 and 600 μm thick;

a buried $SiO_2$ oxide layer (denoted by BOX), the thickness of which is generally comprised between 0.1 μm and 5 μm, preferably between 0.2 μm and 2 μm; and a thin layer of silicon called the "device layer", the thickness of which may in principle reach a few micrometers, but in the case of the invention generally does not exceed 500 nm, or even 200 nm.

In accordance with one embodiment of the invention, an additional layer, for example made of polycrystalline silicon (polysilicon), is deposited on top of the device layer. The thickness of this layer is at least twice, preferably at least five times greater than or even ten times greater than that of the device layer. The choice of polysilicon is advantageous for technological reasons, since it is easy to deposit a layer of polycrystalline silicon on top of a monocrystalline silicon device layer, but this is not exclusive.

The additional layer, which is thicker and hence stiffer, is used to produce the support structure, while the sensitive part of the probe, comprising the AFM tip, is produced on the basis of the device layer, which is less massive. The buried oxide allows the probe to be anchored to the substrate.

The use of a polysilicon additional layer deposited on an SOI substrate constitutes a preferred solution since it makes it possible to make use of tried and tested technologies, but numerous alternatives are possible. For example, the device layer may be produced in a material other than silicon, such as SiN. It is also possible to produce some parts of the probe in the device layer of an SOI substrate and others in a material such as $Si_3N_4$ or any other material having suitable mechanical properties. Similarly, the additional layer does not necessarily have to be made of polysilicon. Whatever the case, a stack is produced that is formed from a substrate, a first, thin layer intended to produce the sensitive part of the probe and a second, thicker layer intended to form the support structure. As will be explained in greater detail with reference to FIGS. 1G-1I, it is also possible to reverse the order of the two layers, i.e. to arrange the second layer (thick support layer) between the substrate and the first layer ("active" thin layer).

Hereinafter, in order to simplify the description, only the case of a probe produced on an SOI substrate, on which a polysilicon additional layer is deposited, will be considered. This generalization does not present any particular difficulty.

In the figures, the second layer is white, the first layer (for example, device layer) is gray, the metallizations are hatched and a dashed line delimits the buried oxide regions that are left for the purpose of anchoring the probe to the substrate. The substrate is also white, since this does not lead to any confusion.

FIG. 1A is a plan view of a probe according to a first embodiment of the invention. This probe is a passive probe, in the sense that it does not include an actuator but instead only an optical transducer (denoted by TO1) making it possible to detect the movements of the tip PT1. In FIG. 1A—as in all of the other figures—the elements obtained on the basis of the device layer are shown in gray. The linkages between these elements and the support structure that is obtained on the basis of the additional layer are represented by boxed crosses, and the anchors for anchoring to the substrate are represented by dashed borders. A thick black line represents the outline of the substrate SU.

In the probe of FIG. 1A, the tip PT1 is borne by a shuttle PCE that takes the shape of a beam oriented in a direction y, referred to as the longitudinal direction, perpendicular to the edge B of the substrate SU. The shuttle PCE is linked to the support structure SMM2 by beam-shaped flexible elements ET1, ET2, ET3, ET4 which extend—or mainly extend—in a direction x, referred to as the transverse direction, perpendicular to the aforementioned direction y, and parallel to the edge B of the substrate. The bending of the elements ET1-4 allows the shuttle to move back and forth in the longitudinal direction y, in parallel to the main surface of the substrate, which is parallel to the plane xy, in accordance with the principle of vertical AFM.

In its rear portion—opposite the tip PT1—the shuttle PCE has a transverse element EG forming a planar optical guide. Two planar waveguides GOP1 and GOP2 are arranged on either side of this element. These waveguides have ends that are oriented in the transverse direction and face each other. Their terminal portions are parallel to the transverse element of the shuttle and are separated from the latter, in the longitudinal direction, by a gap, the width of which is comprised between a few nanometers and a few hundreds of nanometers. This arrangement is such that the two waveguides are coupled, by evanescent waves, to the transverse element EG of the shuttle. Thus, luminous radiation propagating through one guide is coupled in the transverse element and, through the latter, reaches the other guide. The intensity of the coupling heavily depends on the width of the gap separating the waveguides from the element EG in the longitudinal direction. The overall assembly thus forms an optical transducer TO1, making it possible to accurately measure the position of the shuttle in the longitudinal direction.

The waveguides GOP1, GOP2 extend in the longitudinal direction, in the opposite direction to the direction of the tip, over the substrate. They terminate in optical ports POP1, POP2 allowing the injection of light.

In the case of producing the probe on the basis of an SOI substrate, the waveguides may be produced in the silicon device layer, but the luminous radiation used must be infrared. It is also possible to use waveguides made of silicon oxide or of any other transparent dielectric material deposited on top of a silicon carrier structure.

The shuttle PCE extends beyond the edge B of the substrate in the longitudinal direction; preferably, as in the case of FIG. 1A, it is entirely arranged beyond this edge, in order to minimize the bulk constraints of the probe; the length by which the tip protrudes with respect to the edge B of the substrate is denoted by DPS; this length of protrusion is typically comprised between 10 µm and 300 µm, and preferably between 100 µm and 300 µm. This is made possible by the presence of the support structure SMM2 which has two arms extending in the longitudinal direction, arranged on either side of the shuttle. As explained above, this support structure is obtained on the basis of a polysilicon additional layer, deposited on top of the device layer in which the shuttle is defined (stated otherwise, on the side of this layer opposite the substrate). The shuttle is linked to the structure SMM2 via two anchoring portions APT1, APT2 that are arranged at the ends of the transverse elements ET1, ET3 (for APT1) and ET2, ET4 (for APT2). In the embodiment of FIG. 1A, the shuttle is not completely produced on the basis of the first layer (device layer, for example) but comprises a portion SMM2a, in the shape of a longitudinal beam, obtained on the basis of the second layer that also forms the support structure. This is optional, but has the advantage of decreasing the risk of a deflection along z, which is not desirable for AFM.

The shuttle PCE, including its portion SMM2a, the anchoring portions APT1, APT2 and the transverse elements ET1, ET2, ET3, ET4, along with the transverse element EG, form the sensitive part SMS of the probe. As is conventional, hereinafter the tip PT1 will be considered to be separate from said shuttle PCE, even though in certain embodiments these two elements may be produced as one piece.

Figure 1B:
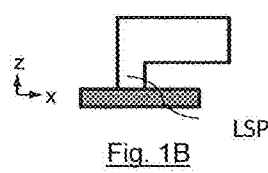
FIGS. 1B and 1C, two detailed views showing anchor regions of the probe of FIG. 1A.
Figure 1C:
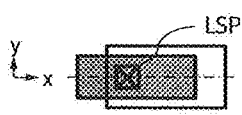

The anchoring portions APT1, APT2 are linked to the support structure SMM2 by linkages LSP3, represented in the figure by boxed crosses. Similar linkages, denoted by the reference LSP2, link the waveguides GOP1, GOP2, which themselves also have anchoring portions AOP1, to the structure SMM2. FIGS. 1B and 1C show detailed, cross-sectional and plan views of these linkages—generally denoted here by the reference LSP. It can be seen that the structure SMM2 is planar and has, corresponding to the linkages LSP, protuberances that extend towards the substrate (oriented negatively in the direction z, perpendicular to the plane xy) until reaching the device layer in which the assembly SMS, the sensor TO1 and the waveguides GOP1, GOP2 are produced.

The structure SMM2 is in turn anchored to the substrate SU via the device layer. More specifically, the device layer has anchoring portions APS1, APS2 which are linked both to the substrate by residual portions AS1, AS2 of the buried oxide layer (represented by a dashed border) and to the structure SMM2 by linkages LSP of the type described above (reference LSP1). This is more clearly apparent in FIG. 1D which shows a longitudinal cross section of the probe (not to scale); in this figure, the reference BOX denotes a residual portion of the buried oxide of the SOI substrate, forming the anchors AS1, AS2. As a variant, the structure SMM2 may be directly anchored to the substrate via an opening made in the layer SMS.

The waveguides GOP1, GOP2 are also anchored to the substrate, at the optical ports POP1, POP2, via the buried oxide. The anchors are denoted by the references AS3, AS4.

Figure 1D:
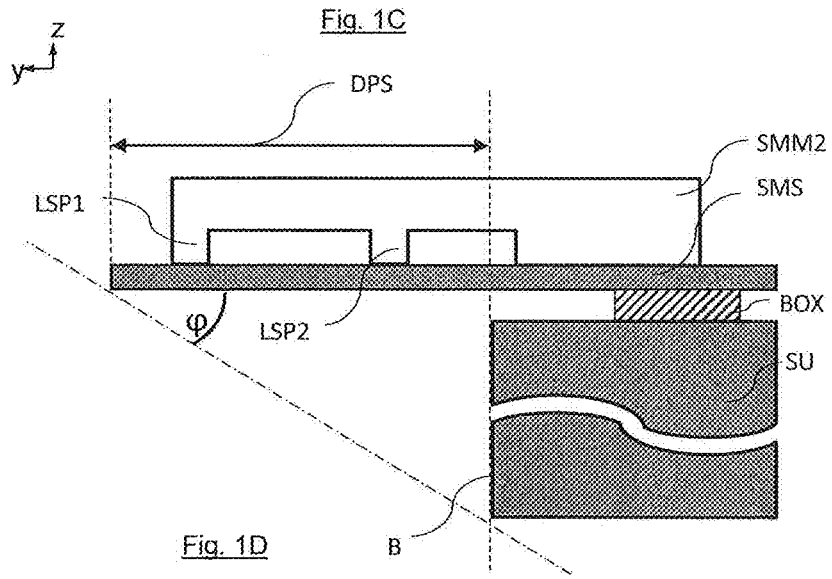
FIG. 1D, a detailed side view of the probe of FIG. 1A.

The angle $\varphi$, which can be seen in FIG. 1D, represents the bulk constraints of the probe perpendicularly to the plane of the substrate. Ideally, it must be as small as possible, which is achieved by maximizing the length of protrusion DPS. In turn, this is made possible by the presence of the structure SMM2 which supports and stiffens the shuttle, without weighing it down. Consider the case of a substrate that is 400 µm thick, where DSP=200 µm, giving $\varphi$=63°.

In order to decrease the angle $\varphi$ at a later stage, it is also possible to thin the substrate SU by etching its back face.

Figure 1E:
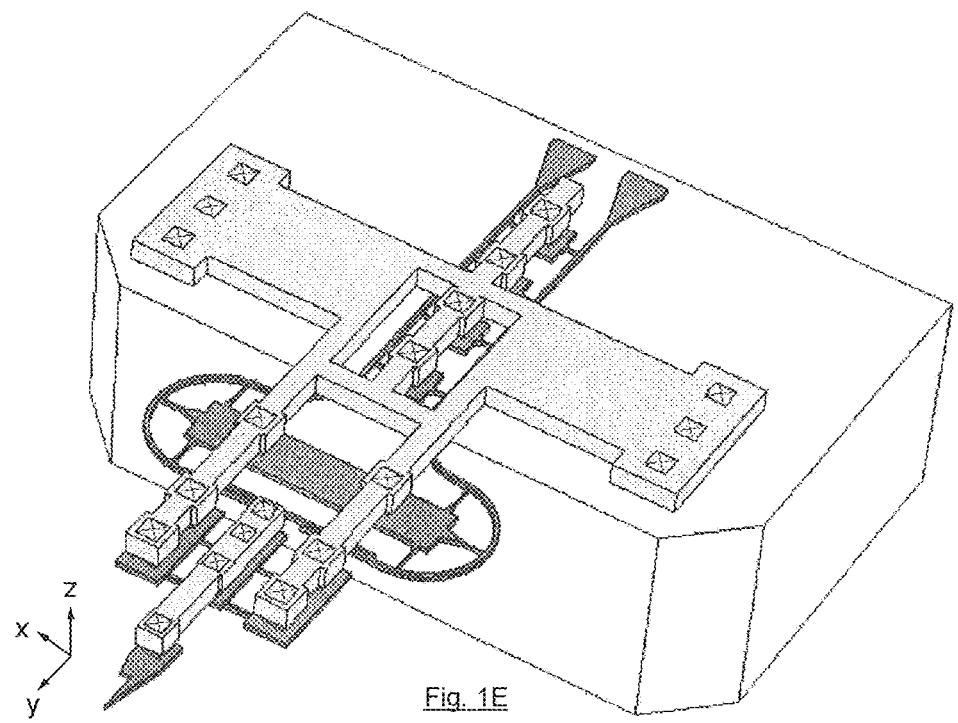
FIG. 1E, a perspective view of the probe of FIG. 1A.
Figure 1F:
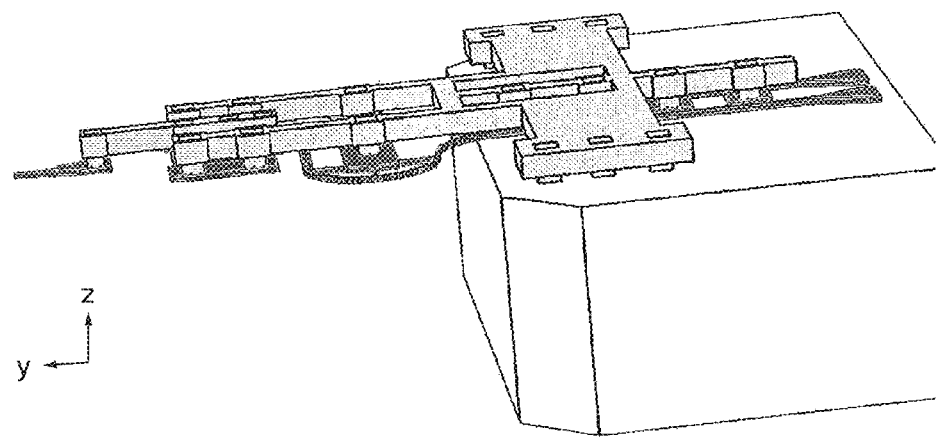
FIG. 1F, a detailed perspective view of a portion of the probe of FIG. 1A.

FIGS. 1E and 1F, which are to scale, make it possible to have a more accurate picture of the structure of a probe according to this first embodiment of the invention.

A probe according to the invention may be fabricated by means of entirely conventional technological processes, described for example in the aforementioned thesis of B. Walter. Typically, the components of the probe (beams, resonators, etc.) are defined in the device layer by means of anisotropic etching. Schematically, the procedure may be as follows:

The tip PT1, the anchoring portions APT1, APT2, the transverse elements ET1, ET2, ET3, ET4 and the transverse element EG of the shuttle, along with the waveguides GOP1, GOP2, are produced by anisotropically etching the device layer DL of an SOI substrate.

A sacrificial layer, for example of silicon oxide, is deposited on top thereof.

Openings are made in the sacrificial layer which correspond to the linkages LSP.

A polysilicon layer is deposited on top of the sacrificial layer (the polysilicon penetrates the openings in order to form the linkages LSP).

The support structure and the element SMM2a are produced by anisotropically etching this polysilicon layer.

The sacrificial layer and the BOX are removed by means of isotropic etching (however, the BOX is left at the anchors, cf. FIG. 1D).

As explained above, etching the substrate from its back face may also be envisaged, in order to thin it for the purpose of decreasing the bulk constraints. The tip PT1, with a radius of curvature of the order of 10 nm, may be obtained by exposing, by means of a suitable etching step, crystal planes of the device layer.

Figure 1G:
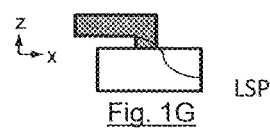
FIGS. 1G to 1I, views analogous to those of FIGS. 1B-D but corresponding to a variant of the first embodiment of the invention.
Figure 1H:
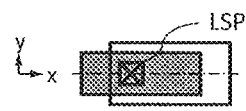
Figure 1I:
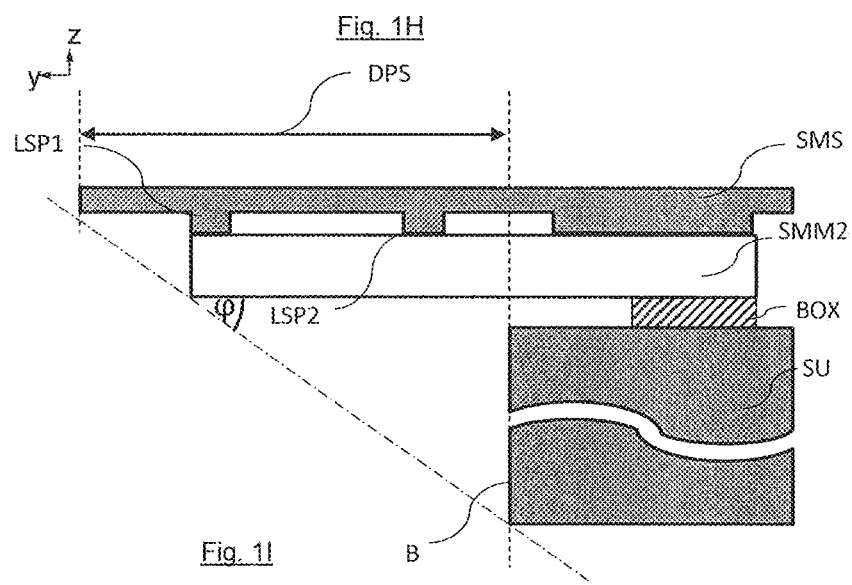

It has been mentioned above that the order in which the layers are deposited could be reversed, in which case the support structure would be arranged between the "device" layer and the substrate. FIGS. 1G, 1H and 1I, similar to FIGS. 1B, 1C and 1D described above, relate to this variant.

This reversal in the order of the layers is mentioned in relation to the structure of FIG. 1A, but may also be envisaged for the other embodiments of the invention.

Figure 2:
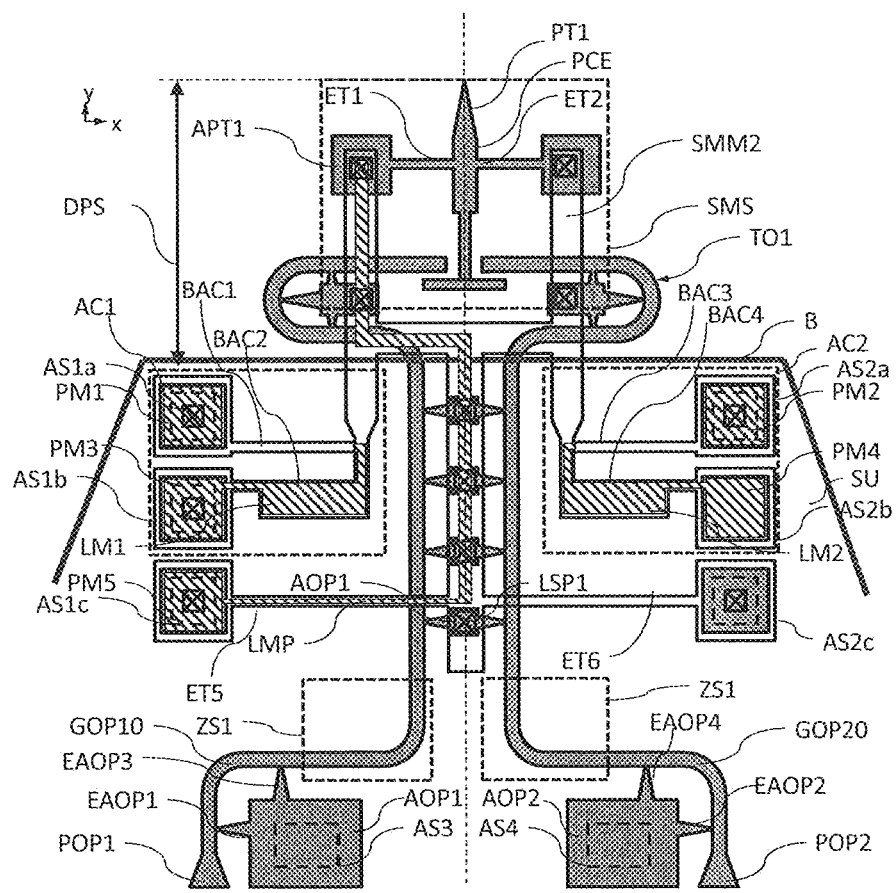
FIG. 2, a plan view of a probe according to a second embodiment of the invention.

FIG. 2 illustrates a probe according to a second embodiment of the invention. It differs from that described above mainly in that the support structure SMM2 may itself be displaced in the longitudinal direction y with respect to the substrate, and do so actively by virtue of thermal actuators AC1, AC2. This displacement drives the assembly SMS, and hence the tip PT1. In addition, as in the first embodiment, the shuttle PCE remains free to be (passively) displaced in the direction y with respect to the support structure, and to do so at a higher frequency due to its lower mass.

The movability of the structure SMM2 is achieved by virtue of the use of flexible transverse elements BAC1, BAC2, ET5 (on the left of the figure) and BAC3, BAC4, ET6 (on the right) to link said structure to the anchoring portions for anchoring to the substrate AS1a, AS1b, AS1c (left) AS2a, AS2b, AS2c (right). The elements BAC1, BAC2 form a thermal actuator AC1. Metal contact pads PM1, PM3 are deposited on the anchoring portions AS1a, AS1b. The element BAC2, referred to as the "cold arm", is wider than BAC1 ("hot arm") and is covered by a metal track LM1 that is linked to the contact pad PM3; the hot arm BAC1, made of doped silicon, exhibits a relatively high resistivity. When a potential difference is applied to the pads PM1, PM3, a current flows through the elements BAC1 and BAC2. Power is dissipated (Joule heating) mainly in the more resistive element BAC1. The resulting thermal expansion produces an increase in its length, while that of the cold arm BAC2 remains unchanged. This differential thermal expansion causes the two transverse elements of the actuator to bend. On the right-hand portion of the probe, the actuator AC2, consisting of the hot arm BAC3, the cold arm BAC4 with the metal track LM2 and the contact pads PM2, PM4, functions in exactly the same way.

The transverse elements ET5, ET7 are passive, and their function is solely to support and to guide the longitudinal displacement of the structure SMM2. The element ET5 also bears a metal track LMP linking a connection pad PM5 deposited on the anchoring portion AS1C to the structure SMS, which has been made partially conductive through doping, in order to hold the tip PT1 at a desired electrical potential.

It is important that the waveguides GOP10, GOP20, the function of which is equivalent to that of the waveguides GOP1 and GOP2 of FIG. 1A, do not interfere with the movement of the structure SMM2 in the longitudinal direction. To this end, they have elbows defining flexible regions ZS1, ZS2. In addition, they are linked to the respective anchoring portions AS3, AS4 via pointed anchoring elements EAOP1, EAOP2, EAOP3, EAOP4, which can be modeled by pivot linkages.

Figure 3:
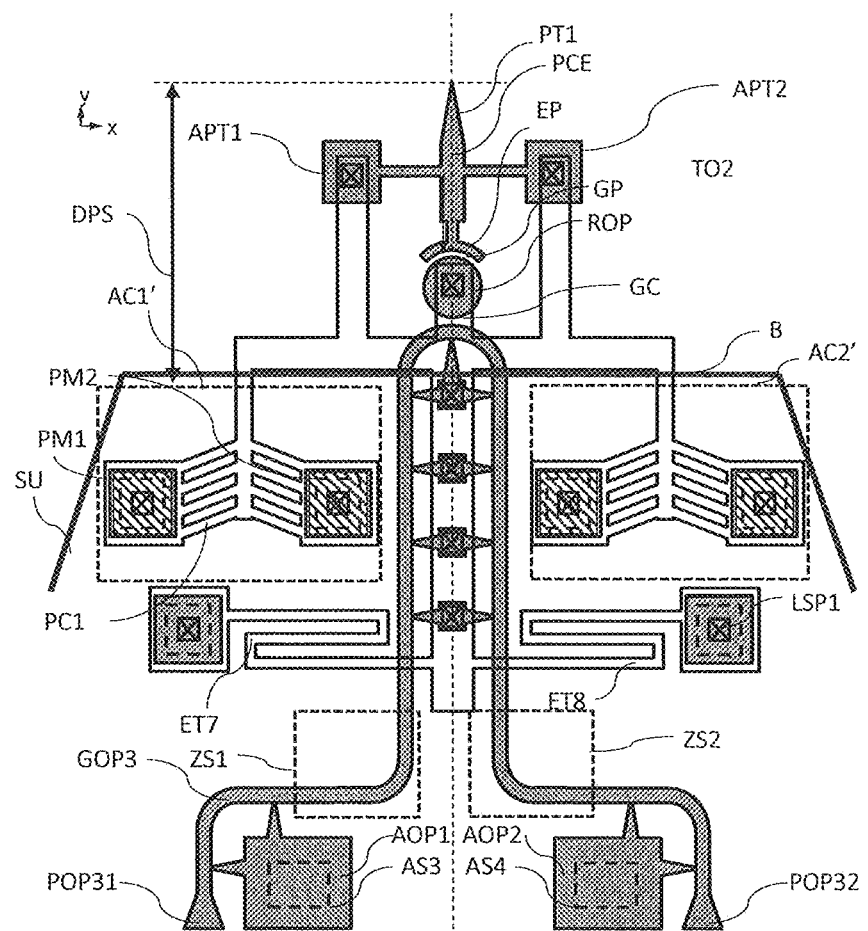
FIG. 3, a plan view of a probe according to a third embodiment of the invention.

FIG. 3 illustrates a probe according to a third embodiment of the invention. As in the second embodiment, the support structure SMM2 is movable in the longitudinal direction, but the actuators AC1', AC2' enabling this movement are of a different type. In this case they are specifically chevron thermal actuators. In the case of the actuator AC1', on the left in the figure, a potential difference is applied between the connection pads PM1, PM2 that are deposited on anchors; an electric current therefore flows through chevron-shaped resistive arms PC1, the point of which is positively oriented in the longitudinal direction (i.e. in the direction of the tip PT1). These arms undergo Joule heating and expand, thereby causing a longitudinal displacement. The actuator AC2', on the right in the figure, functions in the same way.

Two hairpin-shaped flexible transverse elements ET7, ET8 contribute to holding the structure PMM2 and guide its displacement in the longitudinal direction.

The probe of FIG. 3 comprises an optical sensor for sensing the displacement of the shuttle TO2 of a different type than that used in the first and the second embodiments of the invention. This sensor comprises a single U-shaped planar optical guide GOP3 having, at its ends, optical ports POP31, POP32 allowing the injection and the extraction of luminous radiation. The curved central portion of the guide GOP3 extends beyond the edge B of the substrate and is coupled via evanescent wave, through a gap GC, with a disk-shaped optical resonator ROP. The rear end of the shuttle PCE bears a circular arc-shaped element EP which is arranged in proximity to the resonator ROP and is separated from the latter by a gap GP, located opposite the gap GC. The width of the gap GP depends on the longitudinal position of the shuttle; in any case, it is sufficiently small for the element EP to be coupled via evanescent wave to the resonator ROP. Thus, the element EP disrupts the resonant frequency of the resonator, the scale of this disruption depending on the width of the gap GP and hence on the position of the shuttle.

Figure 4:
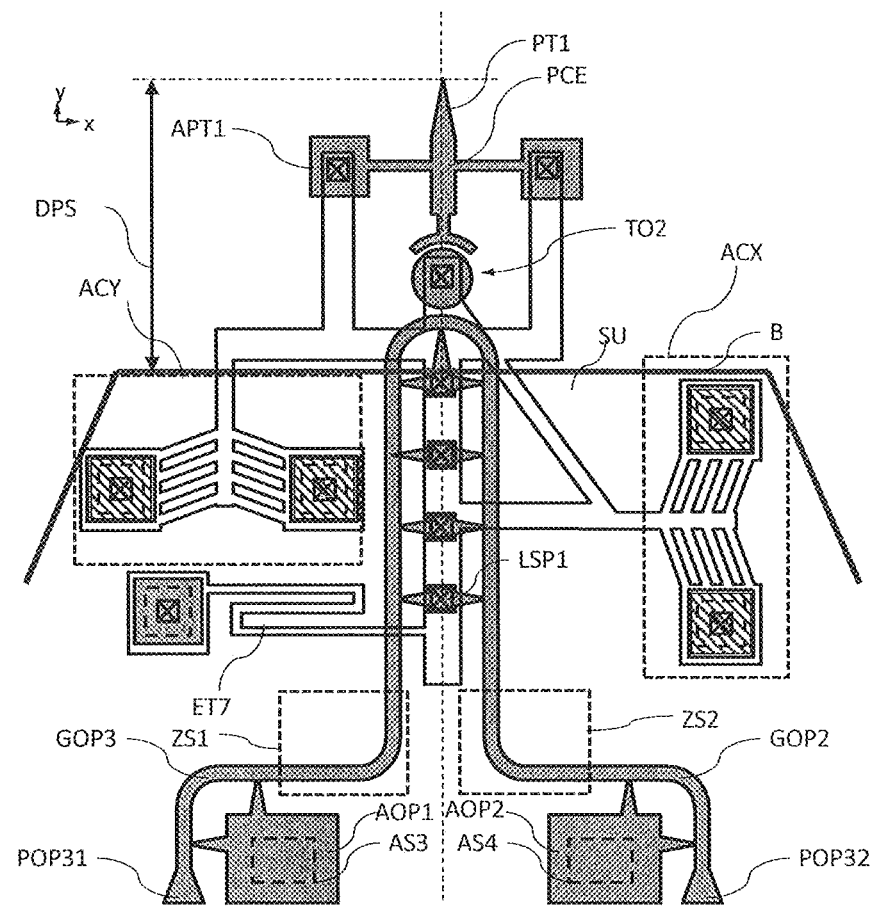
FIG. 4, a plan view of a probe according to a fourth embodiment of the invention.

FIG. 4 illustrates a probe according to a fourth embodiment of the invention. It differs from that of FIG. 3 mainly in that it comprises two thermal actuators ACY, ACX acting in orthogonal directions. These thermal actuators are of the chevron type described above. The actuator ACY is substantially identical to the actuator AC1' of FIG. 3 and, like the latter, produces a displacement of the structure SMM2 in the longitudinal direction y. The actuator ACX is rotated by 90° with respect to ACY, such that it displaces the structure SMM2 in the transverse direction x, making it possible to rapidly scan a surface to be studied in said transverse direction. For space reasons, only one hairpin-shaped transverse structure ET7 is present.

Figure 5:
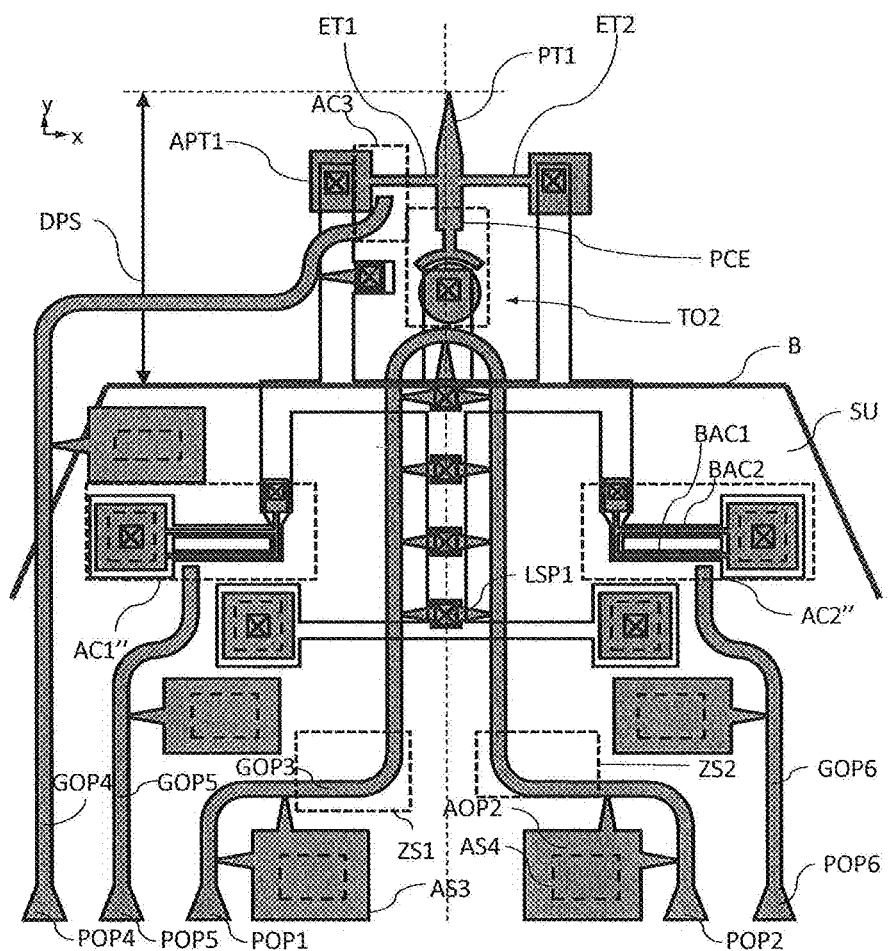
FIG. 5, a plan view of a probe according to a fifth embodiment of the invention.

FIG. 5 illustrates a probe according to a fifth embodiment of the invention, having an "active" shuttle, i.e. a shuttle provided with an actuator allowing it to be displaced in a controlled manner, in the longitudinal direction y, with respect to the support structure SMM2. The latter is also provided with an actuator allowing it to carry out a longitudinal displacement, as in the embodiments of FIGS. 2 and 3. Given that the mass of the shuttle PCE is much lower than that of the support structure SMM2, it would be possible to displace it at a substantially higher frequency. This embodiment makes it possible in particular to implement a resonant AFM technique.

The actuator AC3 of the shuttle is a thermo-optical actuator: a planar waveguide GOP4 transports luminous radiation, injected by virtue of an optical port POP4, and directs it towards one (ET1) of the transverse elements holding the shuttle; the heating produced by the radiation causes the element to expand, and hence to bend. This actuator is especially suitable for exciting a resonant mode of the structure, rather than for near-static operation.

The actuators AC1", AC2" of the structure SMM2 are also of thermo-optical type. The actuator AC2" has two transverse arms, one "hot" arm BAC1 and one "cold" arm BAC2. A planar waveguide GOP6 transports luminous radiation, injected by virtue of an optical port POP6, and directs it towards the "hot" arm BAC1, which is heated and expands. The actuator AC1" functions in a similar manner (the waveguide associated with this actuator is denoted by the reference GOP5, and the corresponding optical port by POP5).

The invention is not limited to the embodiments that have just been described. For example, other types of transducers and actuators may be used. The transducers do not have to be optical transducers, but could, for example, be piezoelectric or electrostatic (capacitive) transducers; similarly, the actuators do not have to be thermal actuators, but could, for example, be piezoelectric or electrostatic actuators. A bidirectional actuation of the support structure (cf. FIG. 4) may be associated with a longitudinal actuation of the shuttle (cf. FIG. 5); furthermore, the shuttle may be actuated while the support structure is passive. The shuttle does not necessarily have to take the shape of a simple longitudinal beam; it may exhibit a more complex structure, for example a ladder structure. The AFM tip may potentially be added on. In addition, the probe is not necessarily symmetrical with respect to a longitudinal axis.

FIGS. 6 to 10 show other embodiments of the invention.

Figure 6:
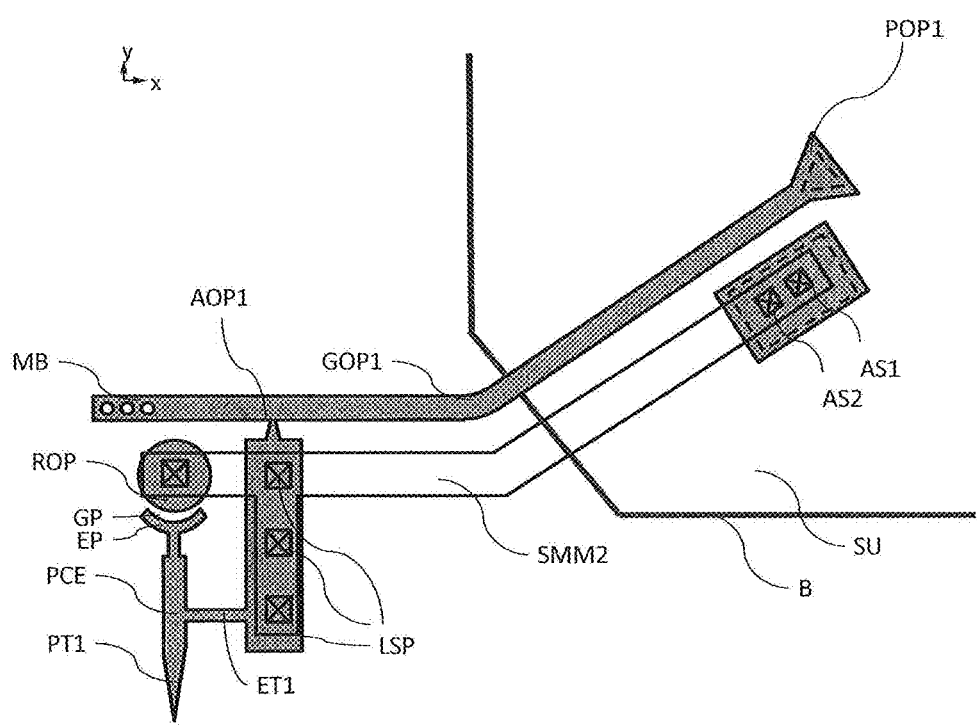
FIG. 6, a plan view of a probe according to a sixth embodiment of the invention.

FIG. 6 illustrates one embodiment in which the support structure SMM2 extends in the lateral direction x from a corner of the substrate SU. The sensitive part of the probe, which extends in the longitudinal direction y, is akin to that of the embodiment of FIGS. 3 to 5, except that it is held by a single transverse element ET1. Its disruptive element EP interacts with a disk-shaped optical resonator ROP, borne by the support structure and excited by a waveguide GOP1 extending in parallel to the support structure and operating by reflection by virtue of a photonic crystal mirror MB.

Figure 7:
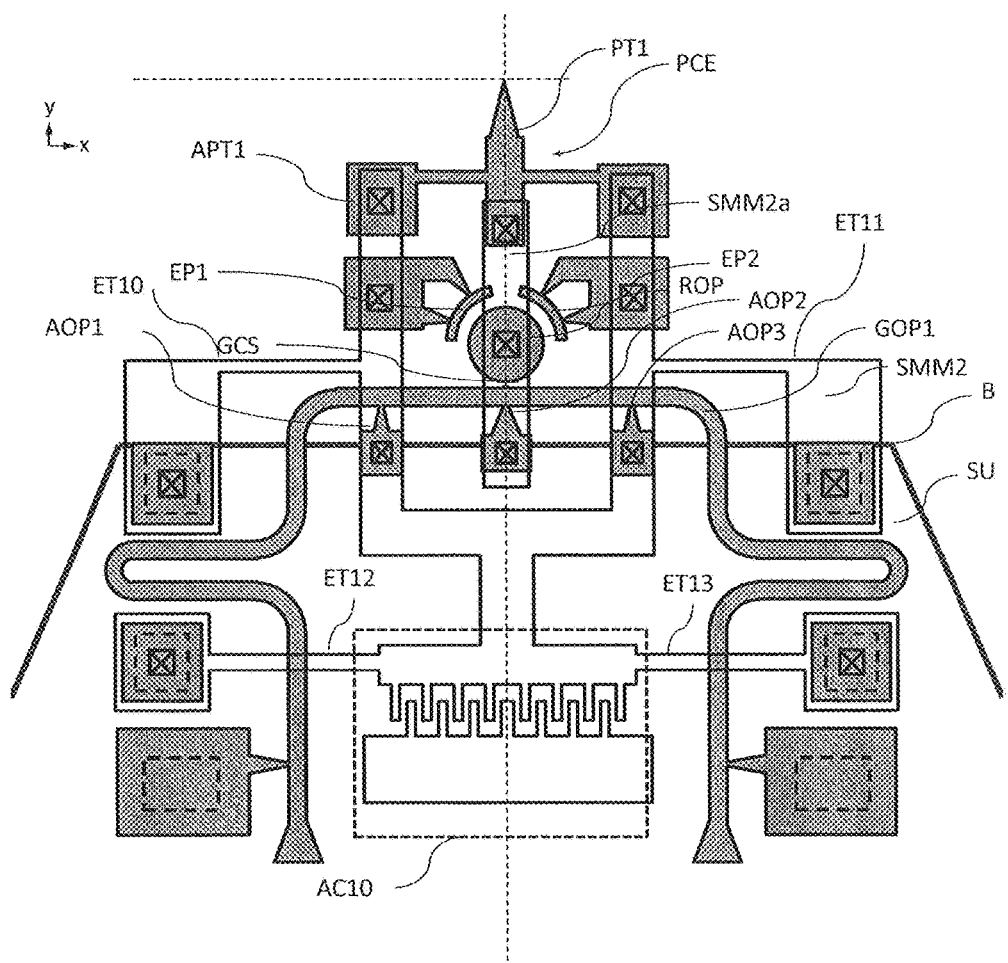
FIG. 7, a plan view of a probe according to a seventh embodiment of the invention.

In the embodiment of FIG. 7, the disk-shaped optical resonator ROP is movable, borne by a "structural" portion SMM2a—produced on the basis of the second layer—of the sensitive part (shuttle) PCE, and its movement is detected by virtue of two disruptive elements EP1, EP2 that are attached to the support structure. Thus, the optical circuit is optimal, since the distance GCS between the resonator and the optical guide GOP1 is constant.

As in the embodiments of FIGS. 2 to 5, the support structure may be displaced in the longitudinal direction y by virtue of an interdigitated electrostatic actuator AC10. This displacement is made possible by flexible elements ET10, ET11, ET12, ET13 which link the movable support structure to anchors for anchoring to the substrate.

Figure 8:
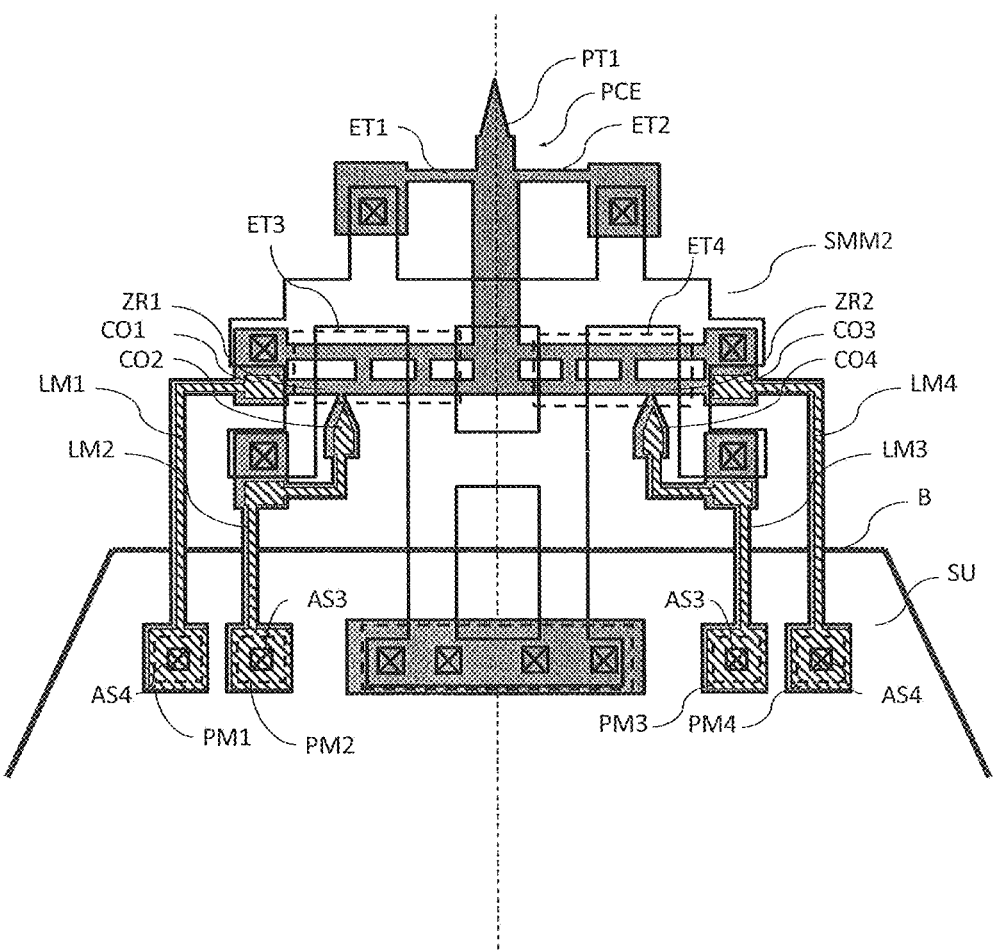
FIG. 8, a plan view of a probe according to an eighth embodiment of the invention.

In the embodiment of FIG. 8, actuation is electrothermal (the movement is produced by an expansion caused by Joule heating, when an electric current passes through a resistive zone ZR1 obtained by doping the first layer) and detection is piezoresistive (the deformation of a resistive zone ZR2, also obtained by doping the first layer, modifies its electrical resistance). The references LM1, LM2, LM3, LM4 denote metal lines enabling actuation (LM1, MM2) and detection (LM3, LM4); the references CO1, CO2, CO3, CO4 denote ohmic contacts. ET3 and ET4 are transverse elements in the shape of composite beams (ladder structures).

Figure 9A:
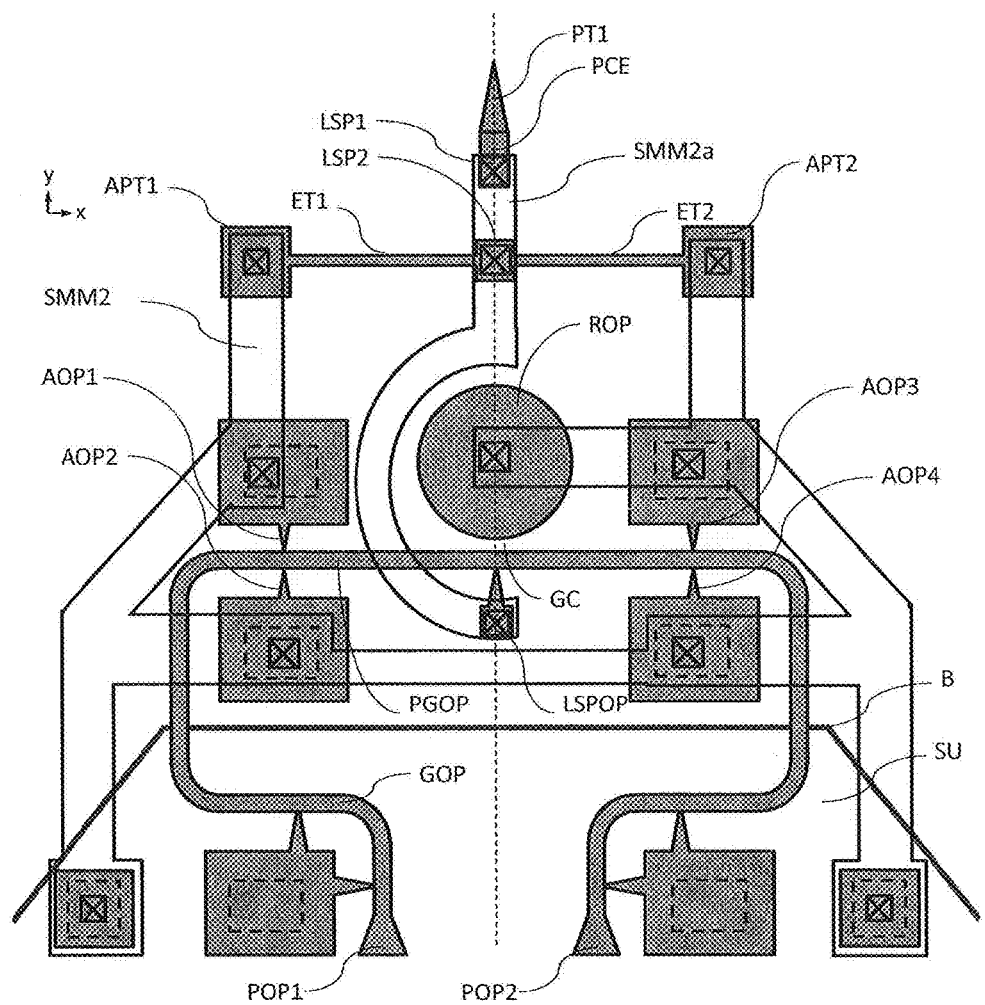
FIGS. 9a and 9b, a plan view of two probes according to two respective variants of a ninth embodiment of the invention.

In the embodiment of FIG. 9a, detection is carried out by a disk-shaped optical resonator ROP, anchored to the support structure which consists of beam-shaped elements. The shuttle PCE mainly consists of an element SMM2a produced on the basis of the second layer, apart from the transverse elements ET1, ET2 and the tip PT1. The element 2MM2a has a crescent-shaped, or semicircular, portion, which partially surrounds the disk ROP. The rear portion of this element is linked via a vertical linkage between the structural layer and the device layer LSPOP to a suspended portion PGOP of a waveguide GOP. Thus, a movement of the shuttle PCE causes the waveguide to bend, and hence varies the size of the gap GC between the latter and the resonator ROP. The advantage of this configuration is that in the event of a substantial backwards displacement of the shuttle (for example if the tip PT1 touches a sample), the waveguide GOP does not risk coming into contact with the resonator ROP.

Figure 9B:
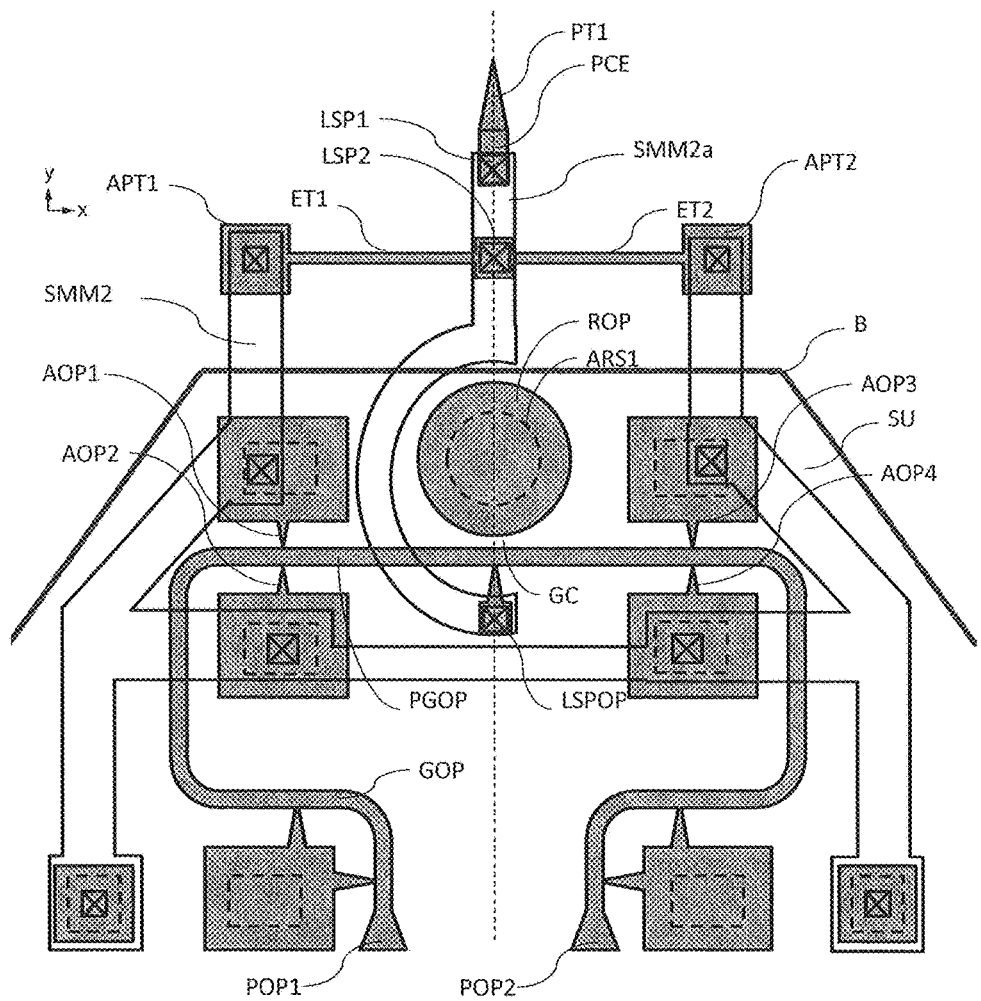

FIG. 9b shows one variant of this embodiment, in which the edge B of the substrate is further forward, and the resonator ROP is anchored directly to the substrate by a buried oxide pillar ARS1.

Figure 10:
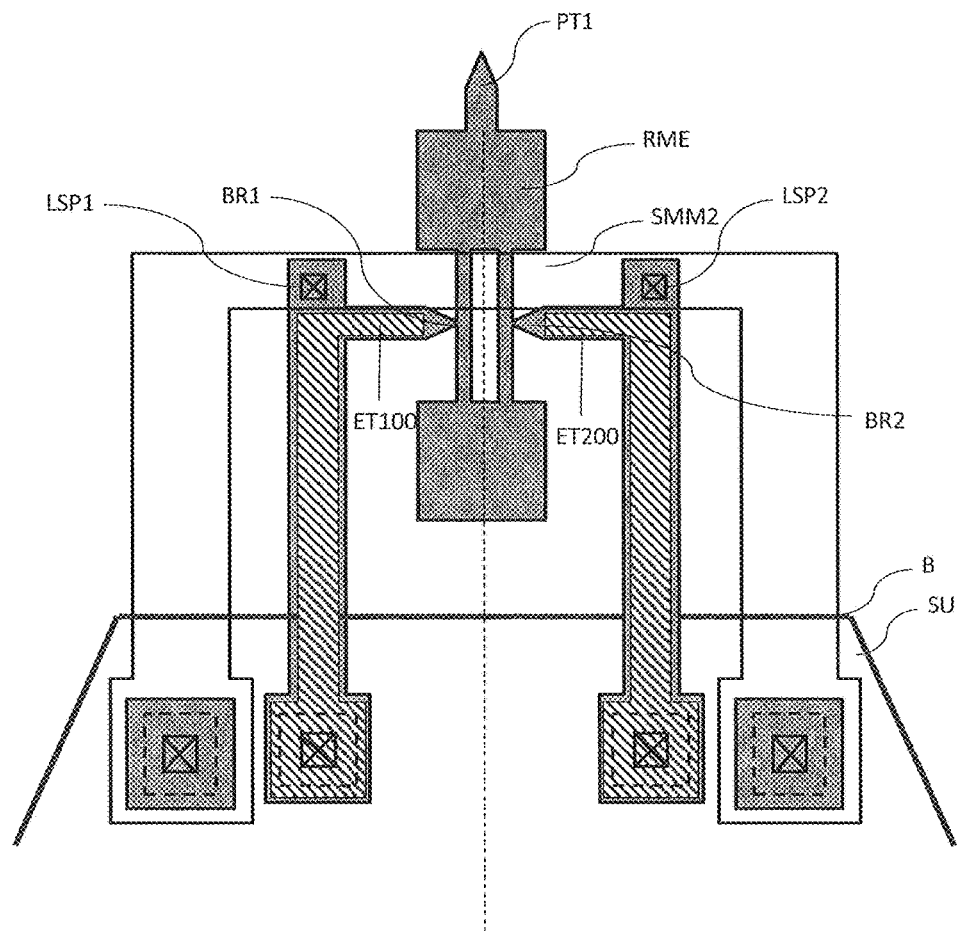
FIG. 10, a plan view of a probe according to a tenth embodiment of the invention.

In the embodiment of FIG. 10, the sensitive part of the probe is not a shuttle: in fact, it is linked to the support structure by two stiff transverse elements ET100, ET200. However, it comprises a mechanical resonator RME that is able to oscillate in a vibration mode having a substantial y-component (an extensional mode in the example of the figure). In general, this resonator may be connected to the arms BR1 and BR2 at the site of a node of the vibration mode. The resonator may for example be chosen from a ring, a disk, a polygon and a plate.

The passage of an electric current through the arms BR1, BR2 of the resonator causes them to heat up, and hence to extend, thereby making it possible to excite the vibration. Typically, the frequency of the actuation current is f/2, f being the resonant frequency of the resonator. Measuring the signal generated at the frequency f enables detection, for example via piezoresistive effect.

Especially in the case of force curve microscopy, it may be advantageous to cool the AFM probe. Specifically, thermal noise limits the smallest measurable displacement value, and this effect increases as the stiffness of the probe decreases. However, cooling by means of conventional cryogenic techniques is not always possible, or convenient.

Now, it is known that a micro- or nanomechanical element placed inside an optical cavity, forming one of its mirrors or coupled to the cavity via evanescent wave, is subject to various forces of optical origin. Under certain conditions, these forces may damp the vibrations of the mechanical object, and hence cool it. For example, the article by G. Anetsberger, E. M. Weig, J. P. Kotthaus, and T. J. Kippenberg, "Cavity optomechanics and cooling nanomechanical oscillators using microresonator enhanced evanescent near-field coupling" Comptes Rendus Physique, vol. 12, pp. 800-816 describes the optical cooling of nanomechanical oscillators via evanescent coupling with a disk-shaped optical resonator.

These concepts may be applied to the invention for those embodiments in which an optical resonator is used to measure the movement of the tip (for example the embodiments of FIGS. 3-7, 9a and 9b).

In particular, it would be advantageous to carry out a force measurement in the following manner:

preparing the movable structure including the tip so that it is in an effective temperature state that is lower than the ambient temperature of the AFM microscope by making use of the optical cooling principle;

using an embedded or external actuator to bring the tip down to the surface, then to retract it, while carrying out a force measurement (force curve tracing);

measuring, in real time, the displacement of the tip by means of optical readout while keeping the effective temperature of the tip as low as possible.

The invention claimed is:

1. A probe for atomic force microscopy comprising a tip for atomic force microscopy borne by a planar substrate having a main surface, said tip being oriented in a direction referred to as the longitudinal direction, parallel to said main surface, wherein:

the tip is arranged at one end of a sensitive part of the probe, which is movable or deformable and linked to a support structure, which is anchored to the main surface of the substrate;

the sensitive part and the support structure are planar elements, extending mainly in planes that are parallel to the main surface of the substrate;

the sensitive part is linked to the support structure via at least one element allowing said sensitive part to be displaced or to be extended in this direction;

the tip, the sensitive part and the support structure protrude from an edge of the substrate in said longitudinal direction;

the sensitive part of the probe is at least partly formed by a portion of a layer of a first material, referred to as the first layer, separated from the main surface of the substrate, and the support structure is formed by a portion of a layer of a second material, referred to as the second layer, that is thicker than the first layer and arranged either above the first layer with respect to the substrate or between the first layer and the substrate.

2. The probe for atomic force microscopy according to claim 1, wherein:

the sensitive part of the probe is at least partly formed by a portion of said first layer, separated from the main surface of the substrate;

at least one other portion of said first layer, referred to as the anchoring portion is rigidly connected to the main surface of the substrate; and the support structure, formed by a portion of said second layer, links the sensitive part of the probe to said anchoring portion of the first layer.

3. The probe for atomic force microscopy according to claim 2, wherein the first layer is a device layer of a silicon-on-insulator substrate and the anchoring portion is rigidly connected to the main surface of the substrate by a buried oxide layer of said substrate.

4. The probe for atomic force microscopy according to claim 2, wherein said support structure is made of polycrystalline silicon.

5. The probe for atomic force microscopy according to claim 2, wherein said sensitive part of the probe comprises an element formed by a portion of said second layer.

6. The probe for atomic force microscopy according to claim 1, wherein at least one said element linking the sensitive part of the probe to the planar support structure is a flexible beam, extending in a direction referred to as the transverse direction, perpendicular to the longitudinal direction and parallel to the main surface of the substrate, allowing said sensitive part to be displaced in said longitudinal direction.

7. The probe for atomic force microscopy according to claim 6, also comprising a transducer configured to detect a displacement of the sensitive part of the probe with respect to the support structure in the longitudinal direction.

8. The probe for atomic force microscopy according to claim 7, wherein said transducer is an optical transducer.

9. The probe for atomic force microscopy according to claim 6, also comprising an actuator, referred to as the first actuator, configured to bring about a displacement of the sensitive part of the probe with respect to the support structure in the longitudinal direction.

10. The probe for atomic force microscopy according to claim 9, wherein h said first actuator is a thermal actuator.

11. The probe for atomic force microscopy according to claim 1, wherein the sensitive part of the probe comprises a micromechanical resonator having a vibration mode exhibiting a longitudinal component, as well as at least one actuator suitable for exciting said vibration mode.

12. The probe for atomic force microscopy according to claim 1, also comprising an actuator, referred to as the second actuator, configured to bring about a displacement of the support structure with respect to the substrate in the longitudinal direction.

13. The probe for atomic force microscopy according to claim 12, wherein said second actuator is a thermal actuator.

14. The probe for atomic force microscopy according to claim 1, also comprising an optical transducer configured to detect a displacement of the sensitive part of the probe with respect to the support structure in the longitudinal direction and at least one actuator, referred to as the second actuator, configured to bring about a displacement of the support structure with respect to the substrate in the longitudinal direction, wherein said optical transducer comprises at least one planar waveguide having a first section that is rigidly connected to the substrate, a second section that is rigidly connected to the support structure and, between the first and the second sections, a section that is flexible in the longitudinal direction.

15. The probe for atomic force microscopy according to claim 1, wherein the thickness of the sensitive part of the probe is less than or equal to 500 nm and the thickness of the support structure is more than or equal to 1 μm.

16. An atomic force microscope comprising at least one probe according to claim 1.

17. The atomic force microscope according to claim 16, configured to operate in force curve imaging mode.

* * * * *